Figure 1:
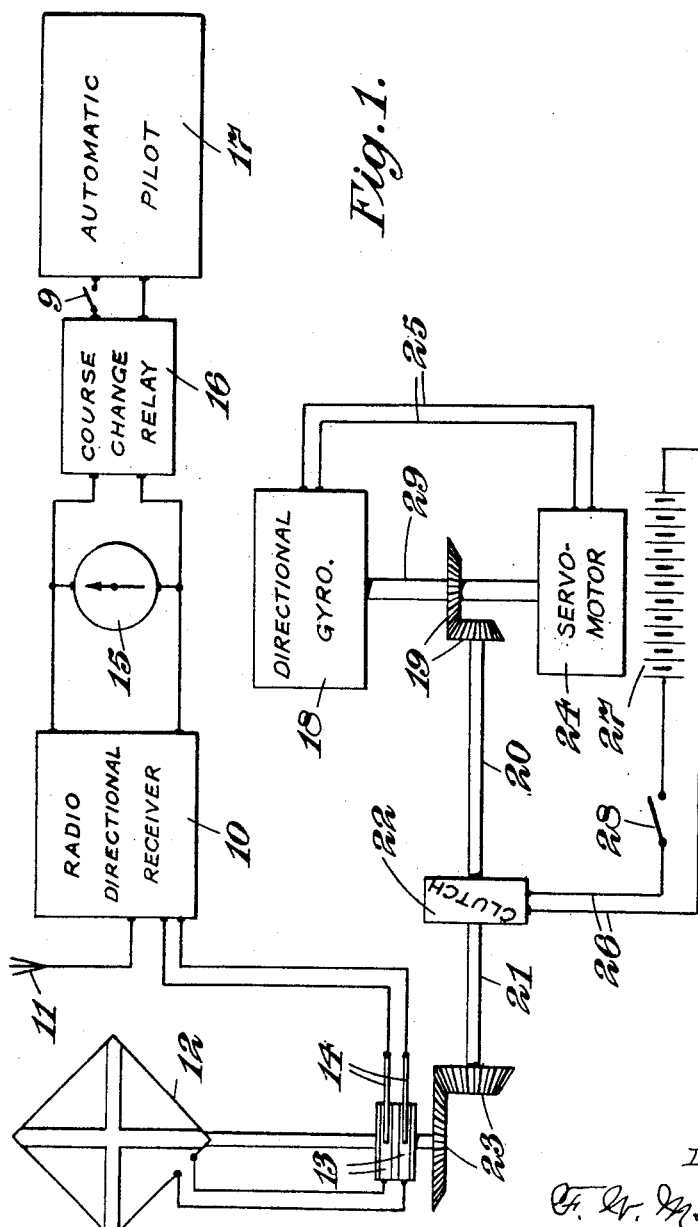

Patented June 30, 1942

2,288,102

UNITED STATES PATENT OFFICE 2,288,102

RADIO DIRECTION FINDING APPARATUS

Frederick William Meredith, London, England, assignor to S. Smith & Sons (Motor Accessories) Limited, London, England, a British company Application March 1, 1940, Serial No. 321,766
In Great Britain March 31, 1939

4 Claims. (Cl. 172—282)

This invention relates to radio direction finding apparatus for use in aircraft to provide an indication enabling the craft to be steered towards a radio transmitting station or to control automatic steering of the craft towards the station.

With the use of such direction finding apparatus if an attempt is made to steer the craft towards the transmitting station by heading the craft in the direction of the radio transmitting station, as indicated by the direction finder, a cross-wind will cause the craft to follow a curved path of increasing curvature until the craft is flying up-wind towards the station. To overcome this difficulty, it has been proposed to alter the direction in which the craft is steered by an amount equal to the angle of drift, but this necessitates knowing beforehand the angle of drift or the strength and direction of the wind. The object of the present invention is to overcome this difficulty in circumstances where no previous knowledge of the wind is available.

According to the present invention there is provided a control apparatus for use in aircraft comprising a radio directional apparatus giving a directional indication or control of steering of the craft and a turn detector such as a directional gyroscope automatically altering the directional indication or control according to the amount of turn of the craft but less than the amount of turn and in the opposite sense to the turn.

The angle through which the directional indication or control is altered by the turn detector should preferably be greater than one-half of the angle through which the craft turns. It is preferable for the response of the turn detector to adjust the datum of the directional indication or control of the radio directional apparatus through an angle approximately 0.7 of the angle through which the craft turns and in the opposite sense.

Further, according to the invention there is provided a control apparatus for use in aircraft comprising a radio directional apparatus and a turn detector combined to give a steering indication or control according to $\beta - n\psi$ where $\beta$ is the turn of the craft relatively to the line joining the craft to a radio transmitting station towards which the craft is to be steered, $\psi$ is the turn of the craft in azimuth and $n$ is less than 1 but greater than zero.

According to a further feature of the invention the directional indication or control is derived from a directional antenna system which is adjustable as regards direction and is coupled to the turn detector for automatic adjustment according to the response of the turn detector. In one form the antenna system comprises a rotatable loop which is driven by means of a directional gyroscope responsive to the turn of the craft in azimuth.

Another feature of the invention consists in that the turn detector also controls a motor for steering the craft and a follow-up connection between this motor and said turn detector has a variable element which is automatically controlled by the signals derived from the directional antenna. Alternatively, the signals derived from the directional antenna may be employed to control independent means for automatically steering the craft.

Figure 2:
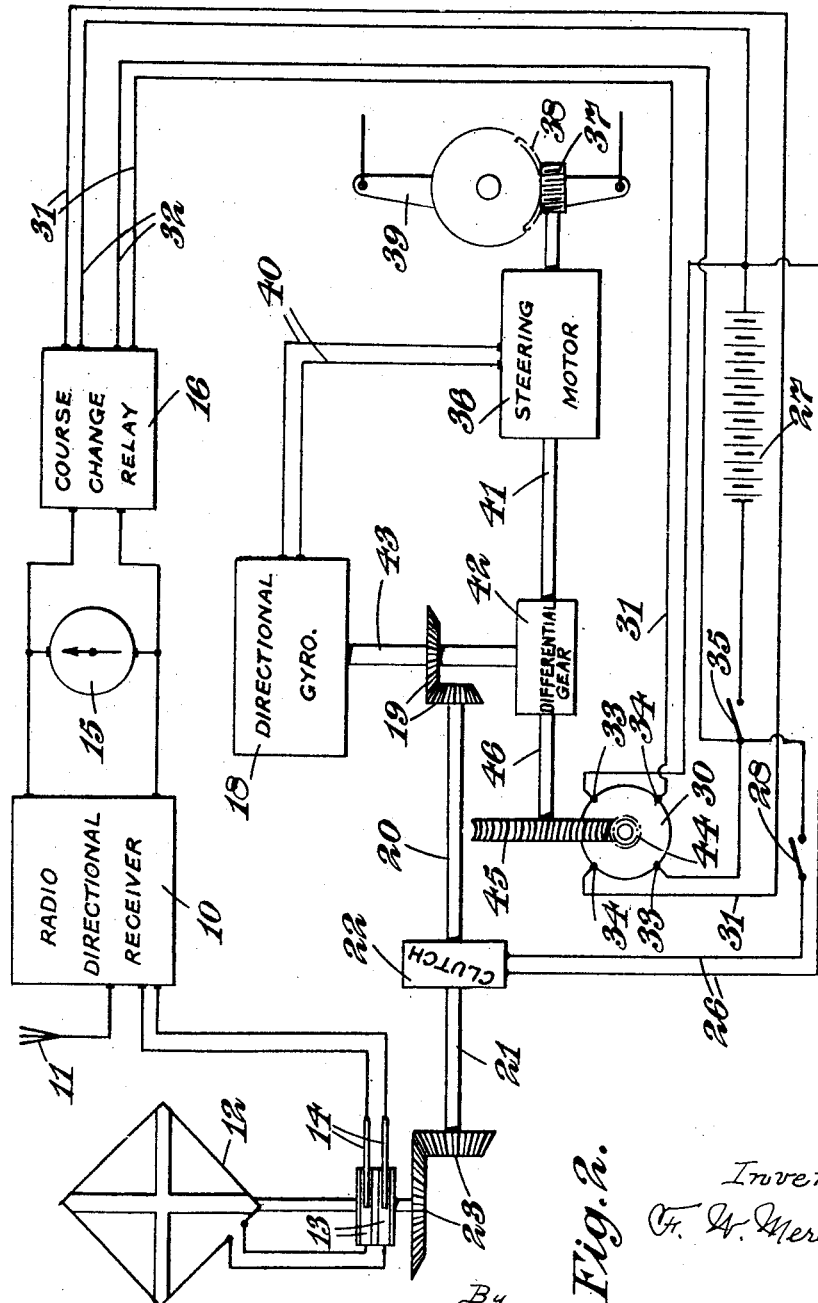

Two different forms of apparatus for carrying out the invention are shown diagrammatically in Figures 1 and 2 of the accompanying drawings by way of examples.

Referring to Figure 1, the radio direction finding apparatus comprises a receiver 10 having a nondirectional aerial 11 and a rotatable loop aerial 12 which is connected to the receiver through slip rings 13 and brushes 14. The receiver output is applied to a radio directional indicator 15 and to a course change relay 16 controlling an automatic pilot 17 through a switch 9.

Normally, the loop 12 is positioned athwartship of the craft and as a result of the combination of signals received from this loop and the non-directional aerial 11 the receiver provides in known manner an output which varies with the orientation of the loop as a result of the craft moving off course. The indicator 15 to which this output is applied has a central zero for a true course indication so that deflection of the indicator in either direction indicates a departure from course in a direction shown by the direction of deflection of the instrument. The course change relay 16 is arranged to be differentially energised according to the sense of deflection of the indicator 15 and controls the automatic pilot 17 in known manner for automatic steering of the craft towards the distant transmitter when the switch 9 is closed.

A directional gyroscope 18 controls a servomotor 24 through electric leads 25 and a follow-up connection is provided through a shaft 29 driven by the servomotor 24 and coupled to a follow-up member of the gyroscope 18. The loop 12 is oriented by rotary movement of this shaft 29, and for this purpose the shaft 29 is connected by gearing 19 to a shaft 20 coupled by an electro-magnetic clutch 22 to a shaft 21 which is in turn connected by gearing 23 to a rotatable mounting for the loop 12. The clutch 22 is operated by an electric circuit 26 including a battery 27 and a switch 28 and the clutch is engaged by the closing of the switch 28.

In operation, the craft is steered towards the distant transmitter under the control of the directional receiver 10. With the switch 28 open so as to disengage the clutch 22 the craft will, owing to drift, follow a path of increasing curvature until the craft is flying up-wind towards the transmitting station. When, after putting the directional control into operation, by closing the switch 9, the indicator 15 reaches its zero position, the control switch 28 is closed to engage the clutch 22. Then, any turning movement of the craft consequent upon drift is detected by the directional gyroscope and produces a rotation of the loop aerial 12 which is in the opposite sense to that in which the craft is turned. The loop aerial 12 is now displaced from its position athwartship of the craft and in consequence the craft will proceed under the control of the directional receiver 10 along a course which is more direct than the course which would be followed without allowing for drift.

If the loop is turned through an angle which is one-half the angle through which the craft turns the craft will follow a path of approximately constant curvature and if the loop is turned through an angle greater than one-half the angle through which the craft turns the craft will follow a path of decreasing curvature. However, if the loop is turned through an angle equal to the angle of turn hunting is likely to occur and therefore an optimum control is obtained by rotating the loop 12 approximately 0.7 of that through which the craft turns. It should be noted that the drift control switch 28 should not be closed until the indicator 15 has reached its central position because the loop aerial 12 would otherwise be rotated as a result of the turning of the craft to come on to course.

In the arrangement shown in Figure 2 the directional gyroscope 18 controls, through electric leads 40, a steering motor 36 which drives a worm 37 in mesh with a worm-wheel 38 connected by a clutch to a steering bar 39 for controlling steering of the craft. A follow-up connection between the motor 36 and the directional gyroscope comprises a rotary shaft 41 driven by the motor and driving one element of a differential gear 42, and a second element of this differential gear driving a rotary shaft 43 which is coupled to a follow-up member of the gyroscope 18. The drive for rotating the loop 12 is taken from the shaft 43 by the gearing 19. The third element of the differential gear 42 is connected to a rotary shaft 46 carrying a worm-wheel 45 meshing with a worm 44 driven by a reversible electric motor 30.

The motor 30 has its armature terminals 33 connected across a battery 27 through a switch 35. The field terminals 34 of the motor are connected to the course change relay 16 by leads 31, and the battery with the switch 35 in series therewith is connected to the relay 16 by leads 32. The relay 16 operates as a change-over switch to reverse the flow of current from the battery 27 through the field winding of the motor 30.

In this case the control of course by the output of the directional receiver 10 is obtained by energising the motor 30 for rotation in one direction or the other, depending upon the direction of deviation of the craft from a longitudinally in-line position with respect to the transmitting station. The operation of the motor alters the follow-up between the steering motor 36 and the directional gyroscope 18 through the differential gear 42 for automatic adjustment of the course. For automatic drift correction the switch 28 is closed, as in the preceding example, to engage the clutch 22 and so produce a rotation of the loop 12 under the control of the directional gyroscope 18 in the manner and to the extent described with reference to the preceding example.

Instead of the craft being steered automatically it may be steered by the human pilot according to the indication provided by the indicator 15. The human pilot thus steers the craft to maintain a central zero indication on the indicator 15 and the directional gyroscope 18 operates to rotate the loop aerial 12 to provide a correction for drift, as hereinbefore described. In this case the course change relay, together with the automatic pilot in Figure 1, or the reversible motor 30 and the coupling to the rudder bar 39 are dispensed with, or put out of operation.

I claim:

1. Control apparatus for use in aircraft comprising a directional radio receiving apparatus, means operated by said receiving apparatus to give a directional indication by which the aircraft is steered, an aircraft turn detector and means controlled by said turn detector automatically altering the directional indication by an amount corresponding approximately to 0.7 of the angle through which the craft turns and in the opposite sense.

2. Control apparatus for use in aircraft comprising a directional radio receiving apparatus, means operated by said receiving apparatus to give a directional indication by which the aircraft is steered, which directional apparatus comprises an antenna system which is adjustable for direction, an aircraft turn detector and means controlled by said turn detector automatically to adjust said antenna system for direction according to the amount of turn but through an angle of .6 to .9 of the angle of turn and in the opposite sense to the turn, said adjustment causing the antenna system to be always directed toward the source of radio signals while the craft is directed up-wind to correct for drift.

3. Control apparatus for use in aircraft comprising a directional radio receiving apparatus having a rotatable loop antenna, means operated by said receiving apparatus to give a directional indication by which the craft is steered, a directional gyroscope, and means controlled by the gyroscope automatically to rotate the loop antenna according to the amount of turn of the aircraft detected by the gyroscope and at all times through an angle selected from the range of .5 to .8 of the angle of turn and in the opposite sense to the turn.

4. Control apparatus for use in aircraft comprising an aircraft turn detector, a servomotor controlled by said turn detector, means operated by said servomotor for steering the aircraft, a follow-up connection between said servomotor and said turn detector, a variable element in said follow-up connection, a directional radio receiving apparatus, means automatically operated by said radio receiving apparatus to control said variable element in the follow-up connection for steering the aircraft, which receiving apparatus comprises an antenna system which is adjustable for direction and means controlled by said turn detector automatically to adjust the antenna system for direction according to the amount of turn detected by said turn detector and through an angle which is .6 to .9 of the turn and which is in the opposite sense to the turn.

FREDERICK WILLIAM MEREDITH.